Oct. 8, 1935.  G. L. N. MEYER  2,016,384
METHOD OF BOTTLING CARBONATED BEVERAGES
Filed May 5, 1933
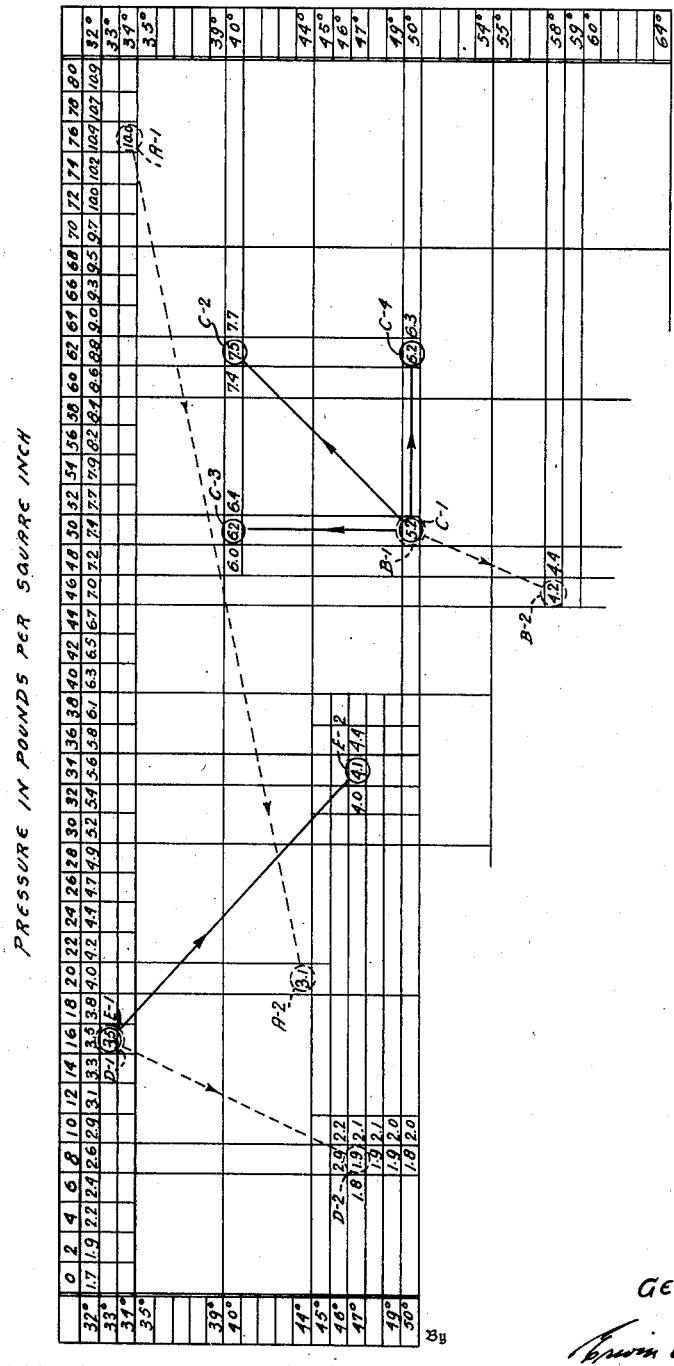
Inventor
GEORGE L. N. MEYER
Attorney Patented Oct. 8, 1935

2,016,384

UNITED STATES PATENT OFFICE 2,016,384

METHOD OF BOTTLING CARBONATED BEVERAGES

George L. N. Meyer, Milwaukee, Wis.

Application May 5, 1933, Serial No. 669,487

8 Claims. (Cl. 226—69)

This invention relates, in general, to a method of bottling beverages and in particular, to a method of transferring and bottling carbonated beverages.

In the process of carbonating and bottling beverages as practiced heretofore, the beverage liquid is ordinarily impregnated with carbon dioxide gas in a carbonating apparatus while under pressure and at reduced temperature. After being carbonated, the beverage is passed through pipe lines, storage tanks and other apparatus to a bottling machine which fills it into bottles.

While the beverage is passing through the pipe lines and apparatus and into the bottles, it usually absorbs sufficient heat to increase its temperature several degrees. Also, the pressure of the beverage is reduced by losses in the pipe lines and apparatus and, in some systems, by a pressure reducing device in the pipe line. Both of these changes of condition decrease the gas absorbing capacity of the beverage and consequently increase the degree of its saturation with carbon dioxide gas.

Ordinarily the volume of gas absorbed by the liquid in the carbonating process is sufficient to substantially saturate it. Hence, when the pressure of the liquid is reduced and its temperature increased, while being transferred to a bottle, its gas absorbing capacity is reduced and it becomes supersaturated with gas.

Although a supersaturated liquid may remain in equilibrium while in a quiescent condition, agitation of the liquid disturbs the equilibrium and causes gas bubbles to form within it. The gas bubbles in rising through the liquid agitate it further and release additional gas. If the beverage is filled into a bottle that is warmer than the beverage, the tendency to lose gas is further increased and the beverage may foam out of the bottle when the bottle is withdrawn from the filling machine.

In bottling beer, foaming of the liquid and loss of gas therefrom is especially undesirable. When the carbon dioxide gas in beer is released, it carries with it from the beverage, valuable esters and bouquets. Further, it forms many minute bubbles in the beer which greatly increase the surface area of the liquid that is exposed to air. In bottling the beer, air is entrained by the liquid as it flows from the filling machine into the bottle. The entrained air comes in contact with the large surface of the beverage exposed by the bubbles and oxidizes some of the esters and bouquets, thereby destroying them.

An object of the present invention is to provide a method of bottling carbonated beverage whereby the loss of carbonating gas incidental to the bottling operation is reduced to a minimum.

Another object of the invention is to provide a method of bottling a carbonated beverage whereby foaming of the beverage during the bottling operation is obviated.

Another object of the invention is to provide a method of bottling a carbonated beverage which avoids the possibility of the beverage foaming out of the bottle when it is removed from the filling machine.

Another object of the invention is to provide a method of bottling beverage whereby the beverage may be bottled without the loss of esters and bouquets.

A further object of the invention is to provide a method of bottling a carbonated beverage whereby the beverage is transferred to and placed in a bottle while in undersaturated condition.

In accordance with the teachings of the present invention, the improved method for bottling carbonated beverages provides a simple and effective means whereby the degree of saturation of the beverage with carbon dioxide is reduced by a change of temperature or pressure, or both, to render the beverage more stable during the bottle filling process and thereby preclude the escape of gas from the beverage, or prevent the undesired foaming of the beverage during or subsequent to the filling of the bottles.

The foregoing and other objects of the invention may be attained by the process described in this specification in connection with the accompanying drawing, in which, the single figure represents a chart showing the volume of carbon dioxide gas held in solution in saturated water under various conditions of temperature and pressure, and having indicated thereon lines representing typical changes in conditions which occur in beverage liquids during bottling thereof.

Temperature is indicated on the chart in degrees Fahrenheit and pressure in pounds to the square inch. Throughout the specification these units are referred to when degrees of temperature or pounds of pressure are mentioned.

In carbonating and bottling beverages of the type comprising carbonated water mixed with a flavoring syrup, it is the usual practice to cool the water before it is carbonated and to impregnate it with carbon dioxide gas in a carbonating apparatus at relatively high pressure, a typical example of the conditions under which water for beverage is carbonated is indicated on the drawing by the dotted circle A—1. This circle has been placed at coordinates corresponding to a temperature of 34 degrees Fahrenheit and a pressure of 76 pounds to the square inch, and the chart shows that at this temperature and pressure the water will hold in solution 10 volumes of carbon dioxide gas when saturated.

After the water is carbonated, the pressure is reduced by a pressure reducing device to about 20 pounds for filling into bottles on a low pressure filling machine of the iso-barometric type. In passing from the carbonating apparatus to the bottle, the liquid absorbs sufficient heat to increase its temperature 10°. The condition of the carbonated beverage as it is bottled by the low pressure filler is indicated by the dotted circle A—2 which is placed at coordinates corresponding to 20 pounds pressure and 44 degrees Fahrenheit temperature. Under these conditions the amount of carbon dioxide gas which water will hold in solution when it is 100% saturated is shown to be 3.1 volumes.

If all of the gas dissolved in the beverage when it was carbonated were retained in it, the beverage would be substantially 322% saturated when bottled under the conditions indicated by the circle A—2. However, inasmuch as a highly supersaturated liquid loses gas rapidly when agitated, a large amount of gas is lost from the carbonated liquid while it is being transferred to the bottling apparatus and filled into the bottles. The amount of gas lost when bottling carbonated liquid in a low pressure filler under these conditions may be as high as 40 or 50 percent of the total volume of gas dissolved in the liquid when it was carbonated.

Because of the high percentage of gas lost by this method, it is necessary to carbonate the liquid at relatively high pressure in order that sufficient gas may be dissolved to insure that the bottled beverage will contain the desired amount of gas after the large losses which occur during the bottling operation.

According to another method of carbonating and bottling beverage, the beverage is bottled at relatively high pressure on the high pressure filling machine of the iso-barometric type. The water is carbonated without being cooled below tap water temperature, which may be taken as approximately 50 degrees Fahrenheit, and at a pressure in the order of 50 pounds, as indicated on the chart by the dotted circle B—1. Under these conditions the water will dissolve 5.2 volumes of gas. According to this method the beverage is bottled substantially at carbonating pressure, there being usually a reduction of 4 or 5 pounds in the pressure in passing from the carbonating apparatus to the filling apparatus. While being transferred and bottled the water absorbs sufficient heat to increase its temperature 8 or 10 degrees. This results in the water being bottled at a pressure of substantially 46 pounds and at a temperature of substantially 58 degrees as indicated by the dotted circle B—2. Under these conditions the water will hold in solution when saturated, 4.2 volumes of gas. Hence, if it were saturated when carbonated and if no gas were lost during the transferring and bottling of the beverage, it would be 124% saturated when filled into the bottles.

However, the agitation of the liquid incidental to the transferring and bottling operations causes gas to be released from the supersaturated liquid and may cause the beverage to foam in the filling machine or to foam out of the bottle when it is released from the machine. Because the degree of supersaturation of the beverage when placed in the bottle by a high pressure filler is not so great as in the case of beverage filled on a low pressure filler, the loss of gas and the tendency to foam are not so marked but are of sufficient magnitude to constitute serious operating difficulties.

In the methods just described and others formerly practiced, the degree of supersaturation is such that the beverage lost its stability and in the transfer of the same from the carbonating apparatus to the bottling machine, large quantities of the carbon dioxide gas were lost and marked detrimental foaming resulted.

The above mentioned loss of gas and detrimental foaming are materially reduced by practicing the improved method of the present invention, wherein the carbonated beverage is transferred and bottled under conditions in which its degree of saturation is reduced to a point where the agitation incident to transferring and bottling the beverage is insufficient to disturb its equilibrium. In practicing the method of carbonating and bottling a beverage in accordance with this invention, the beverage liquid may be carbonated, as in the previously described method, under the conditions of 50 degrees temperature and 50 pounds pressure indicated on the chart by the solid circle C—1 and then filled into bottles on a high-pressure iso-barometric filling machine. Instead of the pressure of the liquid being reduced and its temperature increased while it is being transferred to the filling machine and filled into bottles as in the previous method, according to the method of this invention, the temperature of the liquid is reduced or its pressure increased or both to reduce the degree of saturation of the liquid.

For example, the temperature of the liquid may be reduced by refrigeration and its pressure increased by a pump or other means after the liquid leaves the carbonating apparatus, to such extent that it will be bottled under the conditions indicated by the solid circle C—2 at which the temperature is 40 degrees and the pressure 62 pounds.

Under these conditions the liquid has the capacity to dissolve 7.5 volumes of gas at the time it is bottled. Inasmuch as it could have dissolved only 5.2 volumes of gas if it were 100% saturated when carbonated, it will not be more than 69% saturated while it is being transferred to the bottling apparatus and filled into the bottles. As an undersaturated liquid does not readily lose gas, the agitation incidental to filling the liquid into the bottle causes very little loss of gas from the liquid and no trouble is experienced from foaming.

After the liquid has been bottled and becomes quiescent in the bottle under the temperature and pressure conditions indicated by the circle C—2, the pressure of the gas over the liquid in the bottle is gradually reduced to atmospheric pressure in order that the bottle may be removed from the filling apparatus without a sudden change in pressure. When the pressure of the beverage is reduced to atmospheric pressure, the beverage changes to supersaturated condition but as it is not being agitated, very little gas escapes from it and the bottle may be removed and sealed without appreciable loss of gas or danger of the beverage foaming out of the bottle. The total loss of gas which occurs during filling in accordance with this method is only 5 or 10 per cent of the volume absorbed during the carbonating operation.

Bottling of a beverage in accordance with the invention may be accomplished by only reducing the temperature of the liquid after it leaves the carbonating apparatus without changing its pressure. A typical condition of liquid, after being changed from the condition indicated by the circle C—1 in this manner is indicated by the solid circle C—3. As shown, the pressure of the liquid is maintained constant at 50 pounds but its temperature is reduced from 50 degrees a sufficient amount so that its temperature when filled into a bottle is substantially 40 degrees. As indicated on the chart, the gas absorbing capacity of the liquid is then 6.2 volumes as compared with a gas absorbing capacity of only 5.2 volumes under the conditions at which the liquid is carbonated. Hence, the liquid under the condition of reduced temperature indicated by C—3 on the chart will be substantially 84% saturated, if it were 100% saturated when carbonated, and can be transferred and bottled readily with minimum loss of gas.

The invention may be practiced also by only increasing the pressure of the liquid after it is carbonated without changing its temperature. For example, liquid carbonated under the conditions indicated on the chart by circle C—1 may have its pressure increased after carbonation to 62 pounds, without change in temperature, which will bring it to the condition indicated by the circle C—4. As indicated by the chart, the liquid under these conditions will have a gas absorbing capacity of 6.2 volumes and its degree of saturation will be substantially 84% of the degree of saturation effected when the liquid was carbonated.

In former methods, beer was ordinarily carbonated at a temperature of 33 degrees and a pressure of 16 pounds, which conditions are indicated on the chart by the dotted circle D—1. The chart indicates that water under these conditions will absorb 3.5 volumes of carbon dioxide gas. Because of the fact that beer contains substances which are not in solution and which affect the gas absorbing capacity of the liquid, the actual amount of gas absorbed by beer under given conditions may vary somewhat from the volume indicated by the chart. However, for the purpose of illustrating the invention, the gas absorbing capacities indicated by the chart may be assumed to apply to beer and other beverages, without introducing error of material significance.

In former methods, the beer in being transferred and filled into a bottle ordinarily absorbs sufficient heat to increase its temperature to approximately 47 degrees. The filling operation is performed on a filling machine of the iso-barometric type, having means for admitting counter pressure gas into the bottle to equalize the pressure in the bottle with that of the beer before the beer is introduced into the bottle. The usual counter pressure applied to beer is eight pounds, hence the pressure of the beer after it has been filled into the bottle and before it is released from the machine is eight pounds.

The condition of the beer after being filled into the bottle is indicated on the chart by the dotted circle D—2 and the chart shows that the beer has the capacity to absorb only 1.9 volumes of gas under these conditions. If the beer had been substantially 100% saturated when carbonated and if no gas were lost, it would be approximately 184% saturated when filled into the bottle under these conditions. However, the agitation to which the beer is subjected in being filled into the bottle causes a large amount of gas to be released and lost, and may cause foaming of the beer during the filling operation or foaming out of the bottle as it is removed from the filling machine. In addition to these difficulties, the gas in escaping from the beer carries with it or destroys valuable esters and bouquets and thereby reduces the quality of the beverage.

In bottling beer in accordance with the present invention the beer may be carbonated as before at a temperature of 33 degrees and a pressure of 16 pounds, which condition is indicated on the chart by the solid circle E—1, or it may be bottled without being impregnated with additional carbon dioxide gas.

When the beer is ready to be bottled, instead of having its pressure reduced, as was the case in the former method, it is subjected to an increased pressure in accordance with the present method. For example, the pressure on the beer when it is delivered to the filling apparatus may be increased to 34 pounds by a pump or other means. As the beer ordinarily increases in temperature during the transferring and bottling thereof to about 47 degrees, it is placed in a bottle under the conditions of 34 pounds pressure and 47 degrees temperature as indicated by the solid circle E—2. As shown by the chart the beer in the bottle under these conditions will have the capacity to absorb approximately 4.1 volumes of gas. Hence its degree of saturation with gas when bottled will be only 85% of its degree of saturation when carbonated. Beer in this undersaturated condition can be transferred to the filling machine and filled into bottles readily with but very little loss of gas and without difficulty from foaming. Because the loss of gas is slight and no foaming occurs while filling the bottles there is very little loss of esters and bouquets from the beer.

After the beer is placed in the bottle, the pressure of the gas in the bottle is released gradually to atmospheric pressure by suitable snifting apparatus to permit the bottle to be removed from the machine without subjecting the beer to a sudden change of pressure. When the pressure of the beer in the bottle is reduced to atmospheric pressure its capacity to absorb gas is reduced to such extent that the beer will ordinarily be in supersaturated condition. However, inasmuch as the beer is then in quiescent state it will remain in equilibrium and will retain the excess gas without danger of foaming out of the bottle so long as it is not agitated. Under some circumstances it may be desirable to cause just sufficient foaming to drive the air from the bottle, by the use of a jetting apparatus or by controlling the snifting apparatus.

The invention set forth herein is susceptible of various modifications and may be practiced with various types of apparatus without departing from the spirit and scope thereof as defined by the subjoined claims.

The invention set forth in the foregoing specification is hereby defined and claimed as follows:

1. The method of carbonating and bottling a beverage which comprises, impregnating a beverage liquid with carbon dioxide gas under a predetermined temperature and pressure condition, changing the temperature and pressure condition to increase the gas absorbing capacity of said liquid and thereby reduce the degree of saturation thereof, transferring said liquid to a bottle while in the latter condition, gradually reducing the pressure on said liquid in said bottle prior to exposing said liquid to atmospheric pressure, and then sealing said bottle.

2. The method of carbonating and bottling a beverage, that comprises subjecting said beverage to pressure greater than atmospheric pressure, impregnating said beverage with carbon dioxide gas while subjected to said pressure, withdrawing said beverage from contact with said impregnating gas, increasing the pressure of said beverage to increase its gas absorbing capacity and thereby reduce the degree of saturation thereof with said gas, transferring said beverage into a bottle at the increased pressure, maintaining said pressure in said bottle until said beverage therein becomes quiescent, then gradually reducing the pressure in said bottle prior to exposing said liquid to atmospheric pressure, and then sealing said bottle.

3. The process of preparing and bottling a solution of gas in a liquid, that comprises impregnating said liquid with gas under pressure, removing said liquid from contact with said gas, increasing the pressure of said liquid to reduce its degree of saturation with said gas, introducing said liquid into a container while under the increased pressure, maintaining said pressure in said container until said liquid therein becomes quiescent, then reducing the pressure in said container prior to exposing said liquid to atmospheric pressure, and then sealing said container.

4. The method of bottling beer, that comprises increasing the pressure of the beer to reduce its degree of saturation with carbon dioxide, filling said beer into a bottle at the increased pressure, gradually reducing the pressure on said beer after it has become quiescent in the bottle prior to exposing the bottled beer to atmospheric pressure, and then sealing said bottle.

5. The method of carbonating and bottling beer, that comprises impregnating the beer with carbon dioxide gas, removing said beer from contact with said gas, increasing the pressure of said beer to reduce its degree of saturation with said gas, filling said beer into a bottle at the increased pressure, maintaining said pressure on said beer until it becomes quiescent in said bottle, then gradually reducing the pressure on said beer in said bottle prior to exposing the bottled beer to atmospheric pressure, and then sealing said bottle.

6. The method of carbonating and bottling a liquid that comprises subjecting said liquid to pressure greater than atmospheric, saturating said liquid with carbon dioxide gas while subjected to said pressure, increasing the pressure on said liquid to increase its gas absorbing capacity and thereby reduce the degree of saturation thereof, transferring said liquid and introducing it into a bottle at the increased pressure and in unsaturated condition, reducing the pressure on said liquid in said bottle prior to exposing the bottled liquid to atmospheric pressure thereby changing said liquid to supersaturated condition, and sealing said bottle while said liquid therein is in said supersaturated condition.

7. The method of preparing and bottling a beverage which comprises, impregnating a beverage liquid with carbon dioxide gas substantially to the point of saturation, then rendering the saturated beverage liquid capable of absorbing additional carbon dioxide gas to permit ready transfer of the beverage liquid without loss of its carbon dioxide content, transferring the carbonated beverage liquid in its undersaturated condition into a pressure containing bottle, gradually relieving the pressure in said bottle upon completion of the filling operation to again render the carbonated beverage liquid in a condition of substantial saturation with carbon dioxide gas prior to exposing said beverage liquid to atmospheric pressure, and then sealing the bottle.

8. The method of preparing and bottling a beverage which comprises, impregnating a beverage liquid with carbon dioxide gas substantially to the point of saturation, raising the pressure on said beverage to increase its gas absorbing capacity and thereby reduce its degree of saturation to permit ready transfer of the beverage liquid without loss of its carbonic gas content, transferring the carbonated beverage in its undersaturated condition into a pressure containing bottle, maintaining the pressure in said bottle until the completion of the filling operation, gradually relieving the pressure in said bottle to render the carbonated beverage in a condition of substantial saturation with carbon dioxide gas prior to exposing said beverage liquid to atmospheric pressure, and then sealing the bottle.

GEORGE L. N. MEYER.